United States Patent
Keymolen et al.

(10) Patent No.: US 10,795,817 B2
(45) Date of Patent: Oct. 6, 2020

(54) CACHE COHERENCE FOR FILE SYSTEM INTERFACES

(71) Applicant: Western Digital Technologies, Inc., San Jose, CA (US)

(72) Inventors: Bruno Keymolen, Ghent (BE); Arne Vansteenkiste, Gentbrugge (BE); Wim Michel Marcel De Wispelaere, Ghent (BE); Stijn Devriendt, Knesselare (BE)

(73) Assignee: Western Digital Technologies, Inc., San Jose, CA (US)

( * ) Notice: Subject to any disclaimer, the term of this patent is extended or adjusted under 35 U.S.C. 154(b) by 18 days.

(21) Appl. No.: 16/193,505

(22) Filed: Nov. 16, 2018

(65) Prior Publication Data
US 2020/0159661 A1 May 21, 2020

(51) Int. Cl.
*G06F 12/0815* (2016.01)

(52) U.S. Cl.
CPC .... *G06F 12/0815* (2013.01); *G06F 2212/621* (2013.01)

(58) Field of Classification Search
CPC .............. G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 6,922,756 B2 * | 7/2005 | Hum | .................... G06F 12/0822 711/141 |
| 7,552,223 B1 | 6/2009 | Ackoauy et al. | |
| 9,135,123 B1 | 9/2015 | Armangau et al. | |
| 9,614,926 B2 | 4/2017 | Gunda et al. | |

(Continued)

OTHER PUBLICATIONS

S. Shukla and M. Chaudhuri, "Tiny Directory: Efficient Shared Memory in Many-Core Systems with Ultra-Low-Overhead Coherence Tracking," 2017 IEEE International Symposium on High Performance Computer Architecture (HPCA), Austin, TX, 2017, pp. 205-216 (Year: 2017).*

J. Li et al., "A New Kind of Hybrid Cache Coherence Protocol for Multiprocessor with D-Cache," 2011 International Conference on Future Computer Science and Education, Xi'an, 2011, pp. 641-645 (Year: 2011).*

(Continued)

*Primary Examiner* — Daniel C. Chappell
(74) *Attorney, Agent, or Firm* — Patent Law Works LLP

(57) ABSTRACT

Example distributed storage systems, file system interfaces, and methods provide cache coherence management. A system receives a file data request including a file data reference and identifies a data cache location with a coherence value for the file data reference. The system queries a reference data store for a coherence reference corresponding to the file data reference and compares the coherence value to the coherence reference. In response to the coherence value matching the coherence reference, the system executes the file data request using the data cache location.

18 Claims, 9 Drawing Sheets

(56) References Cited

U.S. PATENT DOCUMENTS

| | | | |
|---|---|---|---|
| 9,785,518 B2 | 10/2017 | Kanteti et al. | |
| 10,282,811 B2* | 5/2019 | Ray | G06F 12/0888 |
| 10,373,285 B2* | 8/2019 | Ray | G06F 12/0831 |
| 10,452,543 B1* | 10/2019 | Smaldone | G06F 12/0804 |
| 10,592,465 B2* | 3/2020 | Dropps | G06F 15/17381 |
| 2003/0212865 A1 | 11/2003 | Hicken et al. | |
| 2003/0236950 A1* | 12/2003 | Clarke | G06F 12/0833 |
| | | | 711/144 |
| 2004/0123046 A1* | 6/2004 | Hum | G06F 12/0822 |
| | | | 711/141 |
| 2008/0256231 A1* | 10/2008 | Burnett | G06F 16/182 |
| | | | 709/224 |
| 2012/0254698 A1* | 10/2012 | Ozer | G06F 11/106 |
| | | | 714/764 |
| 2018/0203802 A1* | 7/2018 | Alves | G06F 12/0895 |
| 2019/0018785 A1* | 1/2019 | Beard | G06F 12/0802 |
| 2020/0134043 A1* | 4/2020 | Demoor | G06F 16/148 |

OTHER PUBLICATIONS

X. Huang, X. Fan, S. Zhang and Y. Chen, "DLWAP-buffer: A Novel HW/SW Architecture to Alleviate the Cache Coherence on Streaming-like Data in CMP," 2012 IEEE 6th International Symposium on Embedded Multicore SoCs, Aizu-Wakamatsu, 2012, pp. 23-28 (Year: 2012).*

C. Fensch, N. Barrow-Williams, R. D. Mullins and S. Moore, "Designing a Physical Locality Aware Coherence Protocol for Chip-Multiprocessors," in IEEE Transactions on Computers, vol. 62, No. 5, pp. 914-928, May 2013 (Year: 2013).*

Shepler, S., et al. "Network File System (NFS) Version 4 Protocol" Network Working Group IETF Tools, Apr. 2003, pp. 1-276. https://tools.ietf.org/html/rfc3530#page-93.

Venkateswararao, Jujjuri "IBM Linux Technology Center, NFS-Ganesha Why Is It a Better NFS Server for Enterprise NAS?". IBM Corporation, Linux Collaboration Summit, 2014, pp. 1-26, events17.linuxfoundation.org/sites/events/files/slides/Collab14_nfsGanesha.pdf.

* cited by examiner

CACHE COHERENCE FOR FILE SYSTEM INTERFACES

TECHNICAL FIELD

The present disclosure generally relates to data storage, and in a more particular example, to distributed data storage systems.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may need to interface with a variety of systems, platforms, and applications, some of which may not include native support for object storage. As such, file system interfaces have been developed to enable systems based on alternate storage protocols, such as network file system (NFS) protocol, to benefit from storing data in a back-end large-scale storage system. In addition to object storage systems, other distributed storage systems may use storage paradigms that do not directly map to the file systems of client systems and may utilize some level of metadata and indirection to map between file data and backend storage data.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels. In some cases, redundancy may include multiple file interface systems, access systems, client systems, and/or distributed storage systems managing file storage transactions with redundancy and various protocols for failover, reboot, retries, etc.

Distributed storage systems may benefit from read/write caching to improve efficiency and reduce latency in data requests. Caching may also be beneficial for supporting indirection between file data protocols and backend storage locations and paradigms. Caches distributed across multiple access systems, including file interfaces, may be effective systems for implementing read/write caching, but may present challenges for managing data coherence across the different caches. It is possible that a file request received at one file interface may modify cached data that is needed for a subsequent file request at another file interface and may not be reflected in the backend system, thus creating coherence issues.

As large-scale storage systems and these file interfaces scale, reliable and efficient implementations for managing cache coherence may be needed. A need exists for at least improved cache coherence management for file system interfaces with distributed storage systems.

SUMMARY

Various aspects for maintaining cache coherence, particularly, cache coherence in a file system interface for distributed storage systems are described.

One general aspect includes a system including: a first file server configured to manage a plurality of file data requests from at least one client system using a file system protocol; a first data cache; a reference data store configured to store a cross-reference of file data references and storage data references; and a cache coherence manager. The cache coherence manager is configured to assign at least one coherence value to the first data cache, store the at least one coherence value in a coherence reference associated with the at least one file data reference for file data in the first data cache, and, in response to a new file data request corresponding to the at least one file data reference, compare the at least one coherence value of the first data cache to the coherence reference associated with the at least one file data reference. The at least one coherence value corresponds to at least one file data reference for file data in the first data cache. The first file server executes the new file data request using file data in the first data cache in response to the at least one coherence value of the first data cache matching the coherence reference.

Some implementations may include one or more of the following features. The system may further include a first cache manager in communication with the first file server and the first data cache. The first data cache may include a plurality of buffer segments. Each buffer segment from the plurality of buffer segments may have a buffer size corresponding to a preferred data element size and a plurality of storage locations for data bytes. The first cache manager may be configured to aggregate file data requests received by the first file server, assign a unique buffer identifier to each of the plurality of buffer segments, and assign, in response to the file data requests, a plurality of byte ranges for file data stored in the plurality of storage locations in the first data cache. The at least one coherence value may include a time-based hash value corresponding to a plurality of storage locations in the first data cache. File data requests may include file data bytes having a file data byte range and the first data cache may include a plurality of storage locations for storing at least one file data byte range. The at least one coherence value may include a plurality of hash values of file data byte ranges in the plurality of storage locations in the first data cache. Responsive to file data requests including at least one file data overwrite command for an affected file data byte range, the cache coherence manager may be further configured to: update at least one coherence value including the affected file data byte range using a time-based hash value for the affected file data byte range; and store at least one updated coherence value in the coherence reference for the affected file data byte range. The system may further include a client response handler configured to: aggregate a plurality of acknowledgement messages corresponding to cached writes to a buffer segment in the first data cache, where the cached writes are not stored to persistent storage; and send the plurality of acknowledgement messages responsive to a hold time for the buffer segment expiring and a storage interface, responsive to the hold time expiring, writing contents of the buffer segment to persistent storage. The reference data store may include a key-value store associating file data references, storage data references, and a plurality of coherence references for the first data cache. The system may further include: a second file server configured to manage a plurality of file data requests from at least one client system using the file system protocol; a second data cache; a first cache manager in communication with the first file server and the first data cache, where the first cache manager is configured to aggregate file data request received by the first file server in the first data cache; and a second cache manager in communication with the second file server and the second data cache, wherein the second cache manager may be configured to aggregate file data requests received by the second file server in the second data cache. The cache coherence manager may be further configured to: assign at least one coherence value to the second data cache, where the at least one coherence value corresponds to at least one file data reference for file data in the second data cache; and store the at least one coherence value for the second data cache in the coherence reference associated with the at least one file data reference for file data in the first data cache. The first file server executes, in response to the at least one coherence value of the first data cache not matching the coherence reference associated with the at least one file data reference, the new file data request using file data in the second data cache.

Another general aspect includes a computer-implemented method, including: receiving a file data request including a file data reference; identifying a first data cache location corresponding to the file data reference, where the first data cache location has a first coherence value; querying a reference data store for a coherence reference corresponding to the file data reference; comparing the first coherence value to the coherence reference; and, in response to the first coherence value matching the coherence reference, executing the file data request using the first data cache location.

Some implementations may include one or more of the following features. The computer-implemented method may further include, in response to the first coherence value not matching the coherence reference, identifying a second data cache location based on the coherence reference and executing the file data request using the second data cache location. The computer-implemented method may further include generating the first coherence value using a hash value of a plurality of storage locations in the first data cache location at a request time of the file data request. The computer-implemented method may further include: monitoring a trust window time threshold for the first data cache location; selectively executing, responsive to a transaction time of the file data request being less than the trust window time threshold, the file data request using the first data cache location without querying the reference data store and comparing the first coherence value. The computer-implemented method may further include, following executing the file data request using the first data cache location, updating the first coherence value using an updated hash value of the plurality of storage locations in the first data cache location after executing the file data request and storing the updated first coherence value as an updated coherence reference in the reference data store. The computer-implemented method may further include: aggregating file data from a plurality of file data requests in a first data cache including the first data cache location; delaying at least one acknowledgement message for the plurality of file data requests; writing an aggregate data element corresponding to the first data cache to a storage system; and sending, in response to writing the aggregate data element, the at least one acknowledgment message. The computer-implemented method may further include: assigning a unique buffer identifier to each of a plurality of buffer segments in a first data cache including the first data cache location, where the plurality of buffer segments each have a buffer size corresponding to a preferred data element size and a plurality of storage locations for data bytes received in file data requests; assigning a plurality of byte ranges for file data stored in the plurality of storage locations in the first data cache; and storing at least one cache data reference in the reference data store using the unique buffer identifier and the plurality of byte ranges, where the at least one cache data reference is associated with a cross-reference to a plurality of file data references for the file data in the first data cache.

Another general aspect includes a system including: a plurality of file servers configured to manage a plurality of file data requests from at least one client system using a file system protocol, where each of the plurality of file servers includes at least one data cache; means for assigning coherence values to each of the at least one data cache in the plurality of file servers; means for storing the coherence values in corresponding coherence references associated with file data references for file data in each of the at least one data cache in the plurality of file servers; means for, in response to receiving a new file data request at a receiving file server, comparing a request coherence value for the at least one data cache in the receiving file server to a request coherence reference, where the request coherence value and the request coherence reference correspond to a request file data reference in the new file data request; and means for executing the new file data request using the at least one data cache in the receiving file server in response to the request coherence value matching the request coherence reference.

Some implementations may include one or more of the following features. The system may further include, responsive to the request coherence value not matching the request coherence reference, means for identifying an updated data cache from among the at least one data cache in the plurality of file servers based on the request coherence reference and means for executing the new file data request using the updated data cache. The system may further include, following executing the new file data request using the at least one data cache in the receiving file server, means for updating the request coherence reference using an updated hash value of a plurality of storage locations in the at least one data cache in the receiving file server after executing the new file data request. The system may further include means for assigning a unique buffer identifier to each of a plurality of buffer segments in the at least one data cache and means for assigning a plurality of byte ranges for file data stored in a plurality of storage locations in the plurality of buffer segments. The system may further include means for writing an aggregate data element from the at least one data cache to a storage system and means for storing a cross-reference of file data references and storage data references. The means of storing the cross-reference may include, for file data in the at least one data cache in the plurality of file servers, a key-value store associating file data references, storage data references, and coherence references.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the handling of cache coherence across file interface systems for a distributed storage system, such as by using coherence values and coherence references in the metadata store of the file interface systems. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
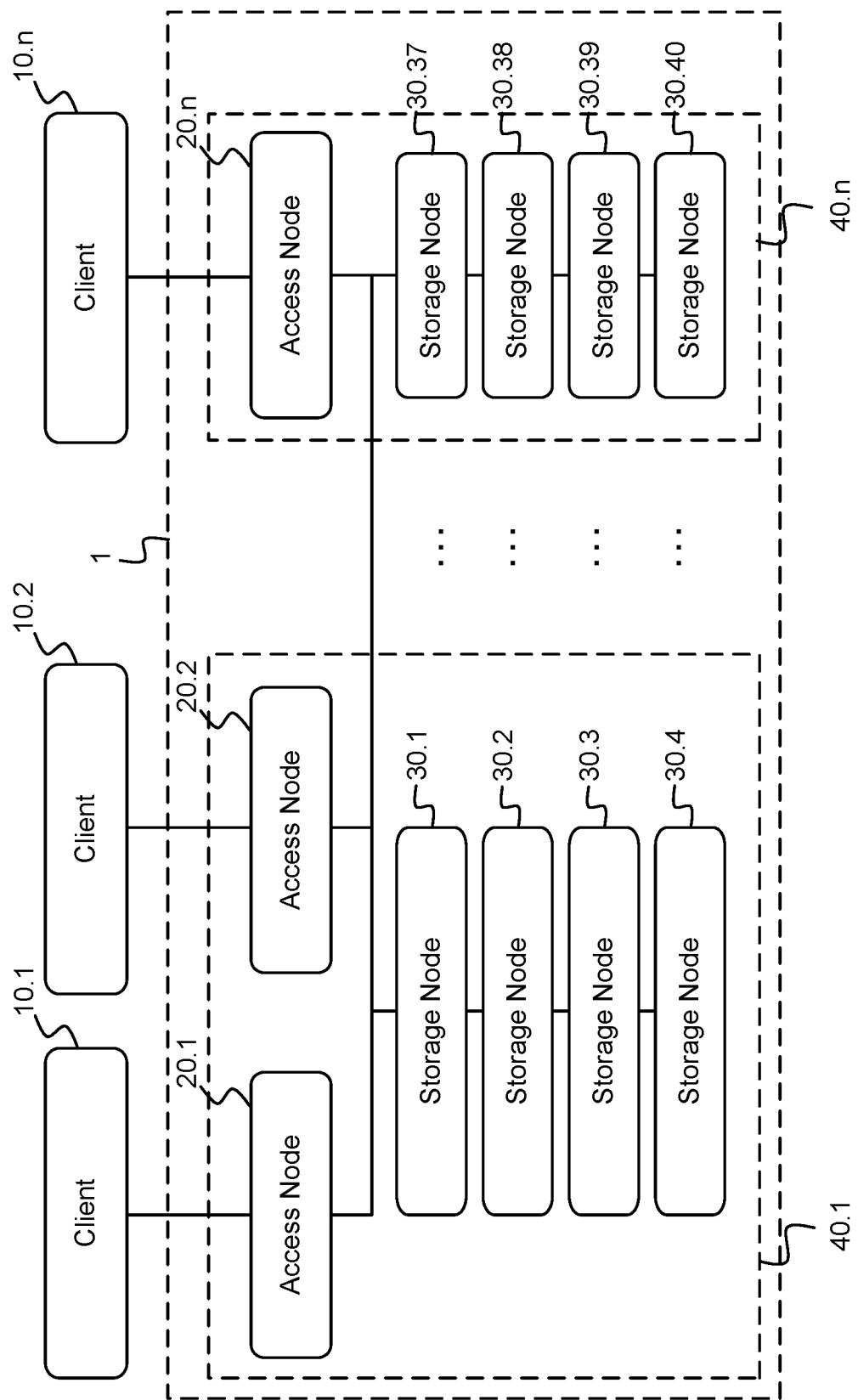
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.n for accessing data objects through one or more access nodes 20.1-10.n. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

Clients 10 may include computing devices and/or systems running applications compatible with one or more file systems that manage data and data access through files, directories, volumes, devices, and/or similar logical structures for mapping data units to physical storage locations. For example, clients 10 may include file system clients configured with a file system protocol, such as the network file system (NFS) protocols, sever message block (SMB) protocols, file allocation table (FAT) protocols, Hadoop distributed file system (HDFS) protocols, Google file system (GFS) protocols, etc.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with S3 may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.*n*, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
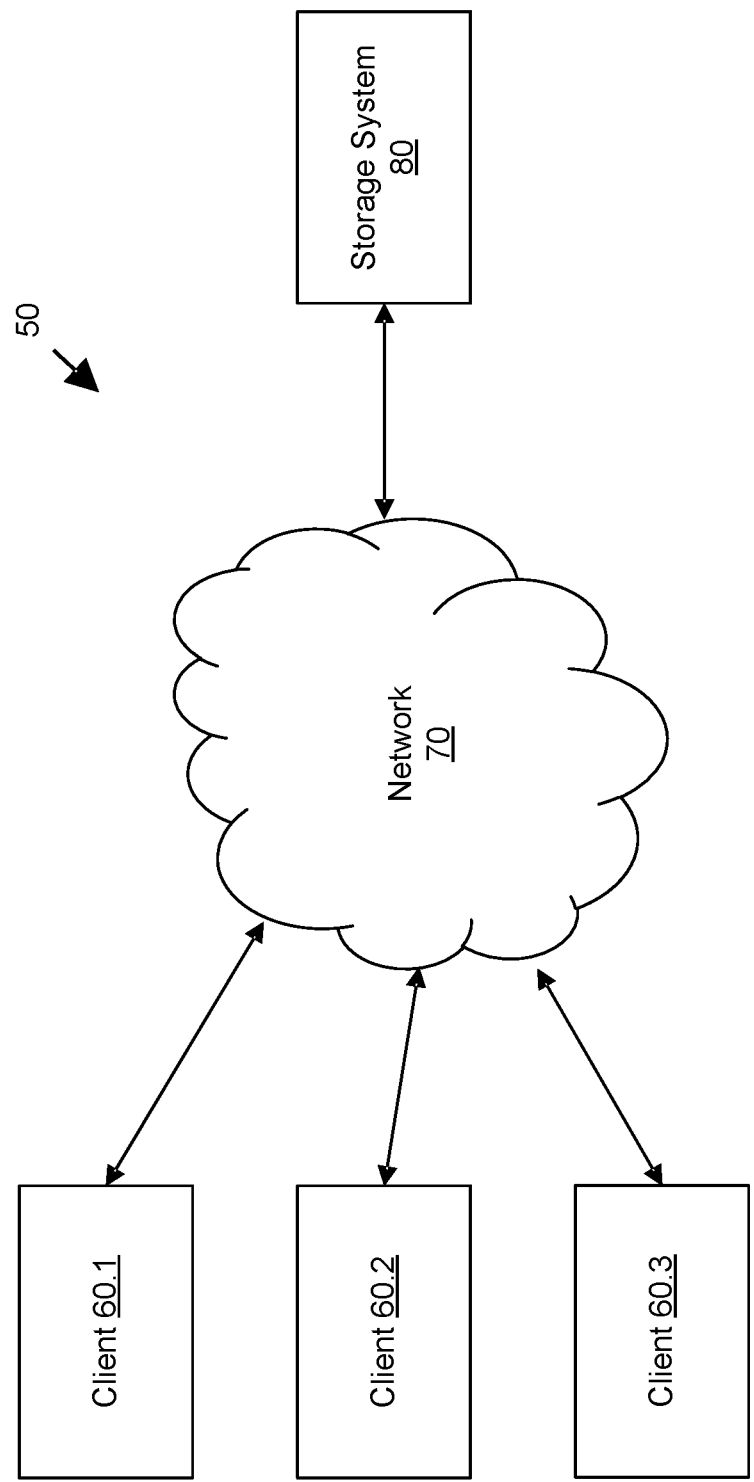
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
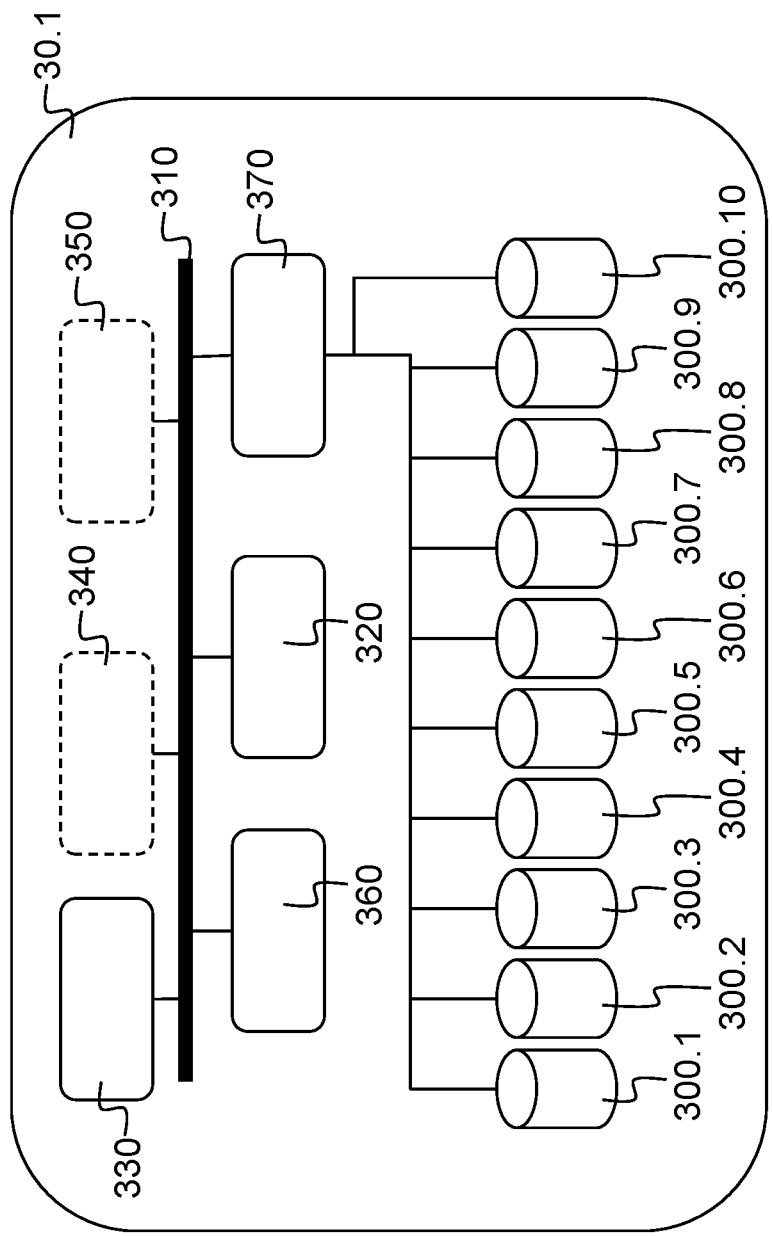
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
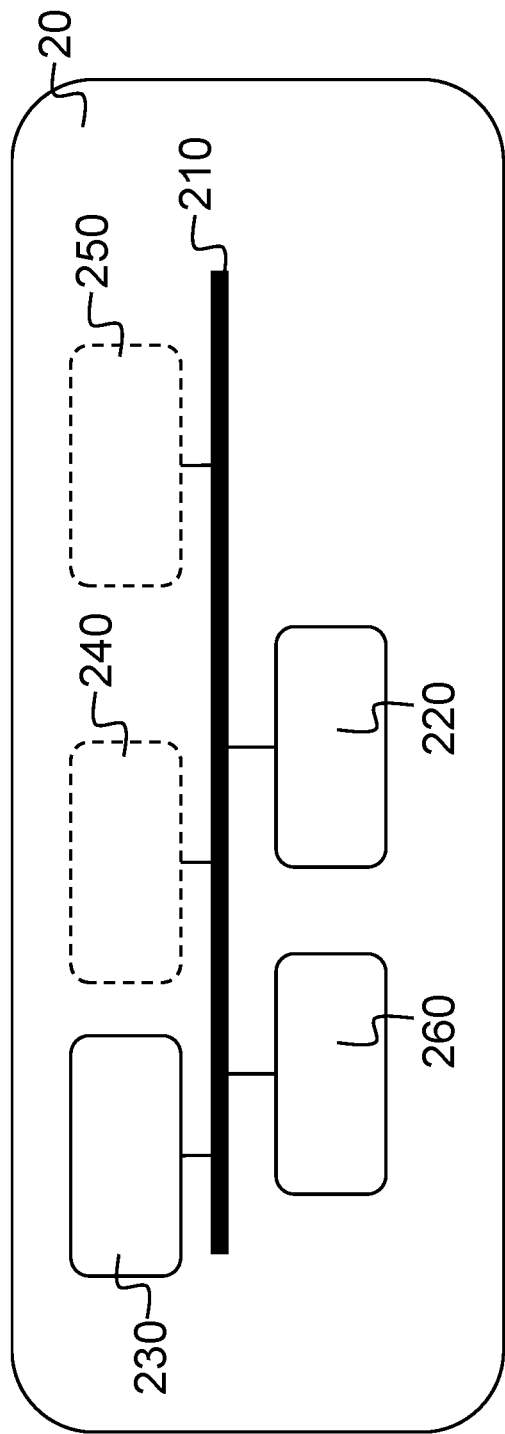
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
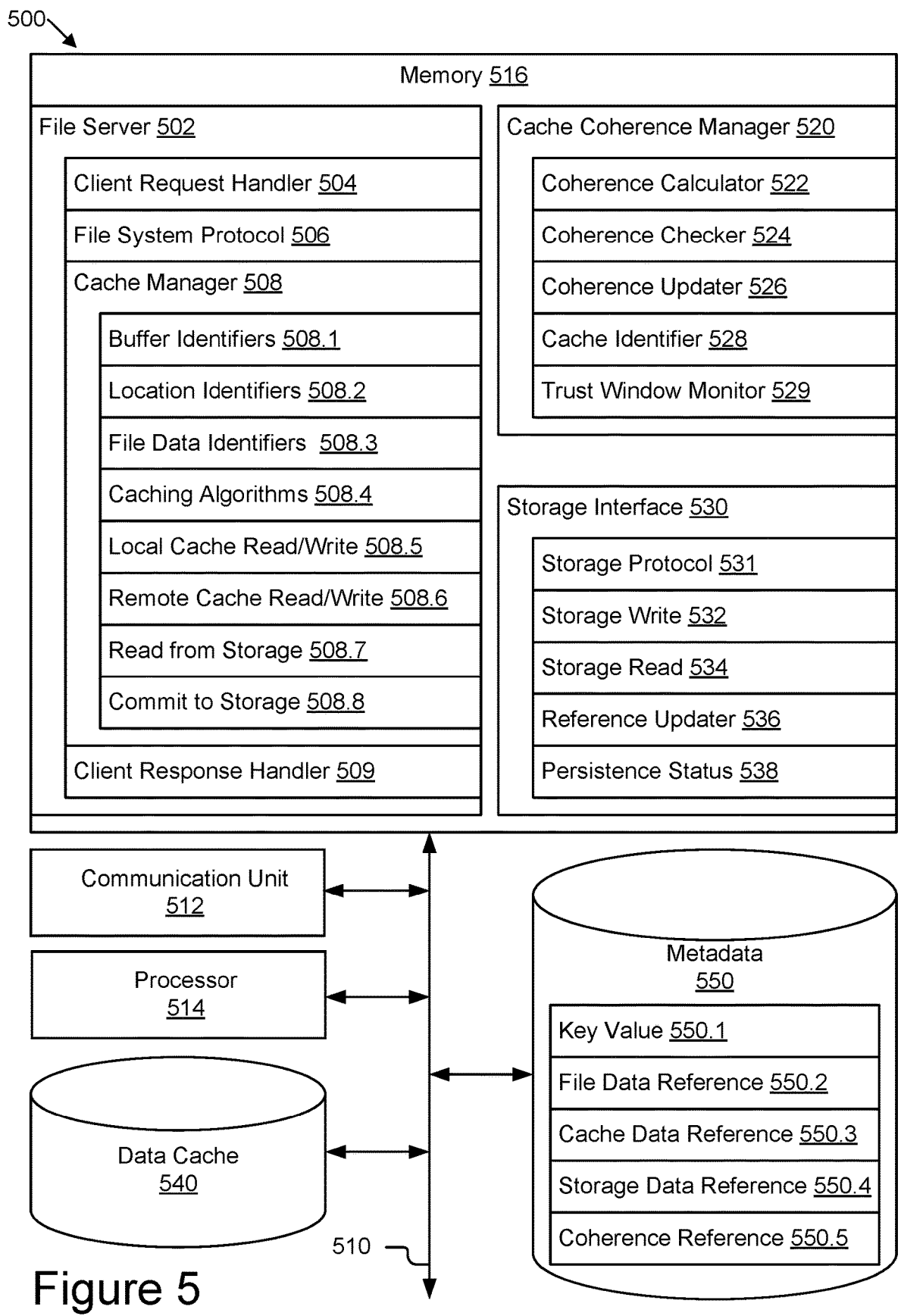
FIG. 5 schematically illustrates some example elements of a file interface system for the distributed storage system of FIG. 1.

FIG. 5 schematically shows selected modules of an access node or controller node with file system interface functions. Access system 500 may be configured as a node with an architecture and/or hardware similar to controller nodes and/or storage nodes. Access system 500 may incorporate elements and configurations similar to those shown in FIGS. 1-4. For example, access system 500 may be configured in an access node 20 with file system interface support.

Access system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Access system 500 may include or have access to one or more databases and/or specialized data stores, such as data cache 540 and metadata store 550. Databases may include one or more data structures for storing, retrieving, indexing, searching, filtering, etc. of structured and/or unstructured data elements. In some embodiments, data cache 540 may include a plurality of specialized buffer memories for efficiently aggregating file data requests into data elements for transfer to a backend storage system, such as the storage nodes 30 of distributed storage system 1, as well as for accelerating read/write requests by processing results from data cache 540 without having to access the backend storage system. Metadata store 550 may be structured as reference data entries and/or data fields indexed by metadata key value entries. Metadata store 550, data cache 540, and/or other databases may be maintained and managed in separate computing systems with separate communication, processor, memory, and other computing resources and accessed by access system 500 through database access protocols, such as structured query language (SQL). Metadata store 550 and data cache 540 may be structured as key-value stores and may be shared across multiple access systems 500.

Access system 500 may include a plurality of modules or subsystems that are stored and/or instantiated in memory 516 for execution by processor 514. For example, memory 516 may include a file server 502 configured to receive, process, and respond to file data requests from file system clients using file system protocols. Memory 516 may include a cache coherence manager 520 for maintaining coherence across read/write caches (e.g. data cache 540) in a plurality of file access systems. Memory 516 may include a storage interface 530 for processing data storage requests to a backend storage system, such as the storage nodes 30 of distributed storage system 1. File server 502 may be configured to receive file data requests, process the received file data requests using data cache 540 to generate one or more storage data requests through storage interface 530 for processing by an associated distributed storage system. For example, a plurality of file data requests using an NFS protocol may be aggregated in data cache 540 until storage interface 530 generates an object data request for an object storage system based on the aggregated file data. File server 502 may communicate with metadata store 550 to store and retrieve data element cross-reference metadata to map the file system files of the requesting client to the storage data elements and/or locations of the distributed storage system. In some embodiments, cache coherence manager 520 and/or storage interface 530 may be integrated into file server 502 and/or managed as separate libraries or background processes (e.g. daemon) through an API or other interface.

File server 502 may receive a plurality file data requests from one or more file system clients. These file data requests may be include file data elements of a defined size, such as 4K, 512K, 1 MB, or other file block sizes. The distributed storage system may be configured to preferably handle a different, larger block size and storage interface 530 may be configured for storage requests in that larger block size. For example, it may be more efficient for storage interface 530 to handle 2 MB, 8 MB, 16 MB, etc. storage elements where possible. Data cache 540 may include a plurality of buffers or buffer segments configured to match the preferred storage element size, such as 8 MB, which are then allocated in locations corresponding to file element sizes, such as 1 MB. File server 502 may include a variety of configurations for allocating cache storage, aggregating file data requests, determining when a storage operation is triggered, and acknowledging file data operations back to the client systems. File server 502 may also invoke cache coherence manager 520 during file data operations to assure the most recent version of the file data is being used from the appropriate cache, which may include use of a remote cache in some configurations.

File server 502 may include a client request handler 504, a file system protocol 506, a cache manager 508, and a client response handler 509. File server 502 may include additional modules (not shown) for other data access features, such as duplicate request handling, request prioritization, metadata management, etc.

Client request handler 504 may include an interface and/or communication event-based condition for receiving file data requests from one or more file system clients. For example, client systems may send a file data request over a network connection and addressed to access system 500 or a port or component thereof. Client request handler 504 may receive these requests and parse them according to the appropriate communication and file system protocol (such as defined in file system protocol 506). For example, client request handler 504 may identify a transaction identifier, a client identifier, a file identifier, a data operation, and additional parameters for the data operation, if any, from the received message or messages that make up the file data request. In some embodiments, a file size may be included in the file data request.

File system protocol 506 may include configuration settings, functions, modules, application protocol interfaces (APIs), extensions, or other elements to support a selected file system protocol. For example, file server 502 may be configured to support a specific set of client systems that use a selected file system protocol, such as such as a NFS, SMB, FAT, HDFS, GFS, etc. protocol. File server 502 may support a single file system protocol or select a protocol from a set of available protocols. In some embodiments, the other modules of file server 502 may utilize the configuration settings or other functions of file system protocol 506 to support receiving, parsing, processing, and responding to file data requests in the selected file system protocol.

Cache manager 508 may include an interface protocol or set of functions and parameters for storing, reading, and otherwise managing data stored in one or more cache locations, such as data cache 540. For example, cache manager 508 may include functions for writing to and reading from data cache 540 in support of processing file data requests received by file server 502. Cache manager 508 may include a data structure and interface for mapping file data into storage locations in data cache 540. Cache manager 508 may include a data structure and interface for storing and/or retrieving cache data references, such as buffer location identifiers, to and/or from metadata store 550. Cache manager 508 may use cache coherence manager 520 for validating the coherence of a selected cache storage locations and/or identifying an alternative cache location containing the current data. Cache manager 508 may include logic for identifying when cached data should be committed to backend storage.

In some embodiments, cache manager 508 may include buffer identifiers 508.1, location identifiers 508.2, file data identifiers 508.3, caching algorithms 508.4, local cache read/write 508.5, remote cache read/write 508.6, read from storage 508.7, and commit to storage 508.8.

Cache manager 508 may include and/or access a variety of logical and/or physical location references for file data as it is received from file system clients and stored and/or read to and from cache. In some embodiments, cache manager 508 may include and/or access reference information for the backend storage system as well. Buffer identifiers 508.1 may unique identifiers that correspond to a physical buffer memory or segment of buffer memory. For example, cache manager 508 may assign a unique buffer identifier or similar buffer reference to each buffer space corresponding to a predetermined storage size, such as each 8 MB segment of data cache 540. Location identifiers 508.2 may assign position references to storage locations with each buffer, such as with a granularity corresponding to a file block size. For example, each buffer or buffer segment with a buffer identifier 508.1 may be subdivided into a sequence of incremental location identifiers 508.2, such as 1 MB increments with serialized positions 0, 1, 2, 3, 4, 5, 6, 7. Thus, the combination of buffer identifier 508.1 and location identifier 508.2 may indicate a specific cache block within data cache 540. File data identifiers 508.3 may include a buffer location in data cache 540 that contains (or is ready to be written with) file data related to file data request. In some embodiments, file data identifiers 508.3 may be expressed as a buffer identifier 508.1, plus a starting location identifier 508.2, plus a file length, which may be expressed as a number storage locations (based on the assigned location granularity, such as defined bytes or blocks). Alternatively, file data identifiers 508.3 may express the extent of the file data in terms of a location range, including the start location and end location for the file or other data segment. File data identifier 508.3 may then be mapped to the file data reference corresponding to the file data in the cache location.

Caching algorithms 508.4 may include an interface protocol or set of functions and parameters for managing caching decisions, such as whether to execute a particular file data request from cache or from persistent storage in the backend storage system. For example, caching algorithms 508.4 may include logic for determining whether file data relevant to a read request is currently available in data cache 540 and/or whether to write new file data to cache or directly to persistent storage. In some embodiments, caching algorithms 508.4 may include logic for allocating write requests to buffer locations (e.g. cache storage locations addressed by buffer identifiers 508.1 and location identifiers 508.2) in order to aggregate smaller file data segments into larger aggregate storage elements, such as larger data objects. A variety of caching algorithms are available depending on the use and configuration of access system 500 and related client and distributed storage systems and expected file sizes and usage patterns. In some embodiments, caching algorithms 508.4 are a set of configurable parameters for determining various thresholds and/or other decision-making logic for efficiently allocating write and/or read requests to data cache 540. Caching algorithms 508.4 may include cache versus persistent storage allocation, buffer and/or location selection and sequencing within data cache 540, parameters for remote cache access, triggers for committing cached file data to persistent storage, triggers for clearing cache, etc. In some embodiments, caching algorithms 508.4 are executed from a cache management library accessible to file server 502.

Local cache read/write 508.5 and remote cache read/write 508.6 may include interface protocols and/or a set of functions and parameters for managing read/write access to data cache 540 and/or similar data caches maintained on other systems, such as a plurality of access systems similar to access system 500. For example, in response to cache manager 508 determining that data cache 540 is going to be used for processing a new file data request, local cache read/write 508.5 may be called to access and store file data to the identified buffer storage locations. In some embodiments, when local cache read/write 508.5 and/or remote cache read/write 508.6 are invoked for a storage operation from cache, cache coherence manager 520 may be triggered to verify the coherence of the file data in the identified cache and/or return an alternative cache location containing more current file data. Remote cache read/write 508.6 may operate similar to local cache read/write and enable access to cache memory through communication unit 512 rather than across bus 510. For example, a remote direct memory access (RDMA) protocol may enable access to the buffer memory of another access system.

Read from storage 508.7 and commit to storage 508.8 may include interface protocols and/or a set of functions and parameters for managing read/write access to the backend storage system, such as storage nodes 30 of distributed storage system 1. For example, file data may be retrieved from the persistent storage system and placed into cache for processing a read request that is needed for repeated reads or read/modify/write operations. As buffers in data cache 540 become full or other considerations trigger persistence, cached file data may be written to persistent storage elements in the backend storage system. In some embodiments, read from storage 508.7 and/or commit to storage 508.8 may invoke storage interface 530 for reading and writing to the backend storage system.

Client response handler 509 may include an interface and/or communication logic for sending response messages, such as result, status, or error messages, to one or more file system clients related to file data requests received. For example, client response handler 509 may wait for processing to complete or generate an error and provide an appropriate result or error message to the client system(s) for each file data request received. For some file data requests, client response handler 509 may send an acknowledgement message when file data has been stored.

In some configurations, this acknowledgement message may be expected by the client file systems to correlate to persistent storage. Because data cache 540 may not be persistent storage and may be subject to data loss in the event of a power failure or other error, client response handler 509 may not immediately return an acknowledgement message in response to file data requests processed to data cache 540. Client response handler 509 may aggregate acknowledgement messages and send them in response to writing the relevant file data to persistent storage. For example, as cache manager 508 aggregates file data writes in data cache 540, no acknowledgement messages may be sent to the client file systems. When storage interface 530 writes the contents of the cache corresponding to those file data writes to persistent storage, a trigger may be sent to client response handler 509 to send the aggregated acknowledgements to the client file systems. In some embodiments, trigger conditions for writing the contents of a buffer segment in cache to persistent storage may include that buffer segment being full or a hold window for filling that buffer segment expiring.

Cache coherence manager 520 may be invoked by file server 502 to verify that the file data being used to process a new file data request from data cache 540 represents the current version of the file data. For example, it may be possible that another access node has processed a request changing the target file data and has the updated data in cache. Cache coherence manager 520 may provide interfaces, functions, and parameters for verifying the coherence of the local cache and/or redirecting the file data request to another data cache with updated file data. In some embodiments, cache coherence manager 520 may be included within file server, such as within a library function used by cache manager 508.

In some embodiments, cache coherence manager 520 may provide each buffer in data cache 540 with a coherence value. For example, cache coherence manager 520 may assign a time-based hash value to each storage location in the buffer and the coherence value for the buffer may be the series of values describing the storage locations in the buffer. Whenever a write operation to the buffer modifies one or more storage locations, the coherence value is updated and stored to a coherence reference associated with the file references for the file data. Whenever a subsequent file data request has a local buffer identified with processing the file data from cache, the coherence value of the buffer may be compared against the coherence reference for use in verifying coherence. If the coherence value and the coherence reference match, the file data in the buffer may be used as the current version of the data. If the coherence value and the coherence reference do not match, then the coherence reference has been updated to reflect a change in the file data in some other buffer. In some embodiments, the coherence reference may also identify the buffer identifier 508.1, location identifiers 508.2, or other addressing information for the cache location with the coherent file data, which may include a cache location in another access system.

Cache coherence manager 520 may include a coherence calculator 522, a coherence checker 524, a coherence updater 526, cache identifier 528, and trust window monitor 529. Coherence calculator 522 may calculate or otherwise generate coherence values for each buffer in data cache 540. For example, as buffers are used for caching file data, a value may be associated with each storage location as a data segment is written to it and the accumulated values may provide a unique coherence value for the buffer. In some embodiments, the location values are assigned sequentially and/or based on time of write operation, to provide a time-based hash value. For example, a buffer with 8 storage locations or bytes may initially receive sequential values "12345678". In some embodiments, not all storage locations may be the same size and the number of storage locations in a buffer may depend on the sizes of the file data elements written there. So, for example, not all coherence values for different buffers may be the same size. Coherence calculator 522 may return or store the coherence value resulting from a write operation to file server 502. Cache manager 508 may maintain a data structure containing local coherence values for all buffers in data cache 540 that are in use. For example, cache manager 508 may maintain a coherence table or coherence value entry in a cache allocation table that may be stored in data cache 540. In some embodiments, the coherence values are stored in their respective buffers. Coherence calculator 522 may also provide the coherence value to storage interface 530 for storage as a coherence reference for the corresponding file data references in metadata store 550.

Coherence checker 524 may check the coherence value for one or more buffers identified by cache manager 508 in data cache 540 against a coherence reference corresponding to the file data reference in a new file data request. For example, a coherence reference may be stored in a data structure including file data references that is shared across access systems. Coherence checker 524 may query the coherence reference data source using the file data reference (or a value derived from the file data reference) as a key or index value. For example, the file data reference may include an inode and filename used for designating one or more entries in metadata store 550 corresponding to the file data. Coherence checker 524 may query metadata store 550 for the coherence reference 550.5 corresponding to the file data reference 550.2 (or other key value 550.1 designating an entry including the file data reference 550.2 and coherence reference 550.5). In some embodiments, storage interface 530 may include an interface to metadata store 550 and coherence checker 524 may process the query through storage interface 530.

Once coherence checker 524 has the coherence value for the target buffer and the corresponding coherence reference from the coherence reference data source, coherence checker 524 compares the values. If the coherence value matches the coherence reference, then the file data in the target buffer is coherent, or the current version of the file data. If the coherence value does not match the coherence reference, then the file data in the target buffer is not coherent, it has been outdated by a modification to the file data, possibly on another access system. Coherence checker 524 may return a status message to file server 502 indicating whether the target buffer is coherent and, therefore, may be used to complete the file data request. If coherence checker 524 determines that the target buffer is not coherent, it may trigger cache identifier 528 to identify the cache and buffer location that is coherent.

Coherence updater 526 may operate similar to coherence calculator 522 for the purpose of modifying coherence values in response to write operations in the buffers. Coherence updater 526 may calculate or otherwise generate updated coherence values for each buffer in data cache 540 as needed. For example, as storage locations in the buffers are written to after the initial write, a new value may be associated with the changed storage location and may replace the prior value in the coherence value for that buffer to provide a new, updated coherence value for the buffer. In the example above for coherence calculator 522, the buffer's initial coherence value was "12345678". After a write updates the third storage location, such as in response to a file data overwrite command, the new coherence value might be "12945678". Then, after a sequential write to the fifth, sixth, and seventh storage locations, the new coherence value might be "1294(10)(11)(12)8" and so on as additional writes modify the contents of the buffer and location values are updated based on the time or sequence of such updates. Coherence updater 526 may provide the updated coherence values back to file server 502 and/or the coherence reference data source, such as metadata store 550, as described for coherence calculator 522.

Cache identifier 528 may identify the location of a coherent buffer in response to coherence checker 524 determining that the target buffer is not coherent. For example, cache identifier 528 may be able to use the results returned from the coherence reference data source query to identify an alternative buffer containing the coherent file data. In some embodiments, coherence reference 550.5 stored in metadata store 550 may include cache data references 550.3, such as buffer identifiers for data cache 540 (e.g. local buffer identifiers 508.1) and buffer identifiers for the data cache in other systems (e.g. other access systems). Cache identifier 528 may be configured to parse the cache data reference 550.3 from the results returned from the queries of coherence checker 524 or may be configured to separately query the coherence reference data source for the cache data reference 550.3 corresponding to the (non-matching) coherence reference 550.5 returned to coherence checker 524. Cache identifier 528 may return cache data references 550.3 for the coherent buffer to cache manager 508 for redirecting the processing of the new file data request to the alternative buffer location.

In some embodiments, trust window monitor 529 may include a configurable trust window during which cache coherence may be assumed or trusted. For example, when cache coherence manager 520 is called, trust window monitor 529 may compare a timer to the transaction time of the last transaction for the target cache location in the file data request. If the last transaction is within the trust window, cache coherence manager 520 may not check coherence and cache manager 508 may immediately process the file data request from data cache 540. In some embodiments, the trust window may be a configurable time value. For example, a default value, such as 25 milliseconds, may be provided as a default, and administrative users may adjust the value higher or lower. A trust window value of 0 may effectively disable trust window monitor 529 and all file data requests may be checked for coherence by cache coherence manager 520.

Storage interface 530 may include an interface protocol or set of functions and parameters for storing, reading, and otherwise managing data requests to an associated distributed storage system and the corresponding metadata data source for mapping file data to persistent storage data elements. For example, storage interface 530 may include functions for reading, writing, modifying, or otherwise manipulating data objects and their respective client data and metadata in accordance with the protocols of an object storage system. Storage interface 530 may generate data requests translated and mapped from file data references 550.2 to storage data references 550.4 using metadata store 550. Storage interface 530 may include a storage protocol 531, storage write 532, storage read 534, reference updater 536, and persistence status 538.

Storage protocol 531 may definite a storage protocol used for sending storage data requests to one or more backend storage systems, such as distributed storage system 1. For example, storage protocol 531 may include an object storage protocol, a different file system protocol than file system protocol 506, or another storage paradigm for persistent storage. Storage write 532 and storage read 534 may include interfaces, functions, and/or parameters for writing data elements to the backend storage system in accordance with storage protocol 531. For example, storage write 532 may be configured to write aggregate data storage elements to persistent storage in response to buffers in data cache 540 becoming full or other triggers for persistent storage (e.g. in response to commit to storage 508.8). Storage read 534 may read data from persistent storage and place it into data cache 540 through or in cooperation with cache manager 508 (e.g. in response to read from storage 508.7). In some embodiments, storage write 532 and storage read 534 may also support processing file data requests through file server 502 without accessing data cache 540 as an intermediary.

Reference updater 536 may be configured to update one or more references in metadata store 550 in response to the processing of file data requests through file server 502. For example, reference updater 536 may initiate and/or update file data references 550.2, cache data references 550.2, storage data references 550.4, and/or coherence references 550.5. Storage write 532 may update one or more file data storage data references 550.4. File write requests received by file server 502 may update one or more file data references 550.2. The actions of cache manager 508 and cache coherence manager 520 may update one or more cache data references 550.3 and/or coherence references 550.5. Reference updater 536 may operate in conjunction with file server 502, cache coherence manager 520, and/or the persistent storage system to generate and update various references in metadata store 550 or other reference storage.

Persistence status 538 may return status messages with regard to file data being stored in persistent storage in the backend storage system. For example, when a storage element, such as a data object containing file data, is successfully written into the backend storage system, a confirmation or success message may be returned to storage interface 530 for that storage element. In response, persistence status 538 may send one or more status messages to file server 502 for each data file in the storage element. In some embodiments, persistence status 538 may use the storage data reference 550.4 to file data reference 550.2 mapping information to determine what file data was included in the written storage element and include the list of file data references in a persistence status message to file server 502. In some embodiments, client response handler 509 may delay acknowledgement of file data requests writing data into data cache 549 until the corresponding persistence status message is received from persistence status 538.

In some embodiments, metadata store 550 may be distributed across multiple systems, such as a plurality of access systems. Metadata store 550 and/or portions thereof may be sharded data stores, wherein the data stores are partitioned into segments stored in different computing systems. Storage interface 530 may include the functions for locating and accessing relevant portions of the sharded data base, such as to support cache manager 508, cache coherence manager 520, and/or other functions of file server 502.

In some embodiments, metadata store 550 is structured as a key-value store. Each key value 550.1 may index a number of corresponding fields, such as file data reference 550.2, cache data reference 550.3, storage data reference 550.4, and coherence reference 550.5, some uses of which have been explained above.

File data reference 550.2 may provide a file data identifier, such as inode and file name, and/or parameters for generating a file data identifier corresponding to a client data file identified in a file data request in accordance with file system protocol 506. File data reference 550.2 may include additional file data related metadata used for managing file data requests. Cache data reference 550.3 may include file data identifiers 508.3, including buffer identifiers 508.1 and location identifiers 508.2 for each file data element. For example, a given key value 550.1, sometimes derived from file data reference 550.2, may index a cache data reference 550.3 and map it to the corresponding file data reference 550.2.

Storage data reference 550.4 may provide a data object identifier, such as a global unique identifier (GUID), and/or parameters for generating a data object identifier corresponding to client data stored in data objects in an associated object storage system and corresponding to the client data file associated with the key entry. Other storage data references may include logical and/or physical mapping for the distributed storage system, such as logical block addresses, file identifiers for a different file-based storage system, etc. Storage data reference 550.4 may be used when the file data in data cache 540 is going to be read from or committed to the backend storage system. Coherence reference 550.5 may provide a code for validating the current state of the file data in a cache with the current version of the file data, which may not be present in data cache 540, as described above.

File server 502 and/or memory 516 may include additional logic and other resources (not shown) for processing file data requests, such as modules for generating, queuing, and otherwise managing data requests. Processing of a file data request by file server 502 may include any number of intermediate steps that yield at least one data request to the distributed storage system from storage interface 530, such as an object data request to an object storage system.

Figure 6:
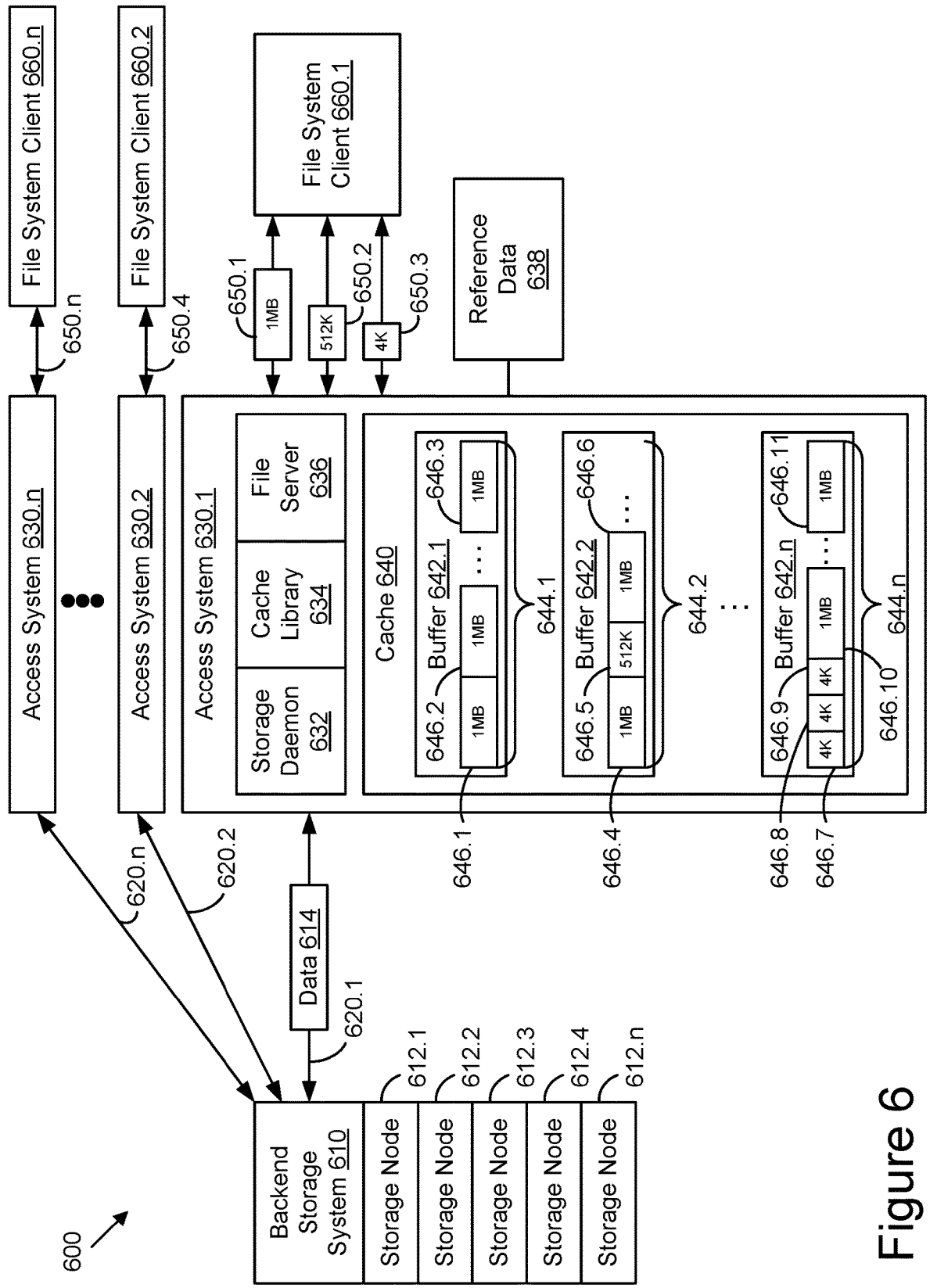
FIG. 6 schematically illustrates interactions among example file system clients, access systems, and distributed storage systems, such as the distributed storage system of FIG. 1.

FIG. 6 shows a distributed storage system 600 with cache coherence management for file data requests from a plurality of client systems through a plurality of access systems. In some embodiments, distributed storage system 600 may be configured according to the systems and elements described with regard to FIGS. 1-5. Distributed storage system 600 may include a backend storage system 610 with a plurality of storage nodes 612.1-612.*n* for receiving and processing storage data requests 620.1-620.*n*. Some storage data requests 620 may include aggregate storage elements, such as aggregate data element 614, containing file data related to multiple file data requests. A plurality of access systems 630.1-630.*n* may receive file data requests 650.1-650.*n* from file system clients 660.1-660.*n*. Reference data store 638 may include common file, storage, cache, and/or coherence references for use by access systems 630.

File system clients 660 may include computing systems using file system protocols to access and store file data. For example, individual computing systems, application servers, legacy enterprise network systems, and other systems may be configured with NFS protocols for data storage and retrieval. File system clients 660 may host or interface with one or more applications that generate file data requests 650, such as read, write, create, delete, move, etc. requests or commands for manipulating data files through data operations. File data requests 650 may include a transaction identifier, a client identifier, a file data identifier, a data operation, and additional parameters for the data operation, if any. File system clients 660 may expect to receive responses corresponding to requests 650, such as acknowledgement that write requests have been stored.

File system clients 660 may be configured to provide file data requests with file data elements corresponding to a file sizes and/or block sizes defined in their respective file system protocols. In some configurations, file system clients 660 may support a plurality of block sizes in file data requests 650, such as 4K file data element 650.3, 512K file data element 650.2, and 1 MB file data element 650.1. File system clients 660 may aggregate smaller file operations for file data requests 650. File system clients 660 may themselves be part of a storage network and different file system clients 660 may issue file data requests for the same file data stored in backend storage system 610 and/or cached in access systems 630.

Selected modules and components in access system 630.1 are shown in FIG. 6. Other access systems 630.2-630.*n* may include similar configurations. Similarly, while only access system 630.1 is shown connected to reference data store 638, in other configurations each access system may have access to reference data store 638. In some embodiments, reference data store 638 may be distributed across access systems 630, with portions or shards of reference data store 638 stored in each access system 630 and/or accessible to or associated with each access system 630.

Access systems 630 may include storage daemon 632, cache library 634, file server 636 and cache memory 640. In some embodiments, storage daemon 632 may be a background process for managing functions related to accessing and updating reference data store 638 and moving file data from cache memory 640 to backend storage system 610. For example, storage daemon 632 may perform a set of functions similar to storage interface 530, as well as cache coherence manager 520 as it relates to querying and updating reference data sources in metadata store 550, as described with regard to FIG. 5. Cache library 634 may include one or more functions for managing cache memory 640 and selectively processing file data requests from cache only when coherence is verified. For example, cache library 634 may perform a set of functions similar to cache manager 508 and those portions of cache coherence manager 520 not handled by storage daemon 632, as described with regard to FIG. 5. File server 636 may include a variety of functions related to receiving and processing file data requests 650 through cache memory 640 and to backend storage system 610, when appropriate. For example, file server 636 may perform a set of functions similar to file server 502 in FIG. 5, including invoking the functions of cache library 634 and/or storage daemon 632 when appropriate.

Cache memory 640 may include a plurality of buffers 642.1-642.n, each having a corresponding buffer size 644.1-644.n. In some embodiments, buffer size 644 may be configured to match a preferred storage data element size for backend storage system 610, such as a preferred data object size for an object storage system. File server 636 may aggregate file data elements 646.1-646.n in the available buffers 642. Aggregate file data elements 646 may represent aggregate file data requests received by access system 630.1 and assigned to respective buffers 642. Each file data element 646 may correspond to one or more storage locations in buffers 642. For example, each file data element 646 may have a file data size corresponding to a number of data bytes or other units for allocating buffer storage and file data size and storage location within the buffer may be expressed as a byte range or byte positions from a starting position to an ending position. Cache library 634 may provide logic for allocating the file data in various file data requests across buffers 642 and storage daemon 632 may write buffers to persistent storage in backend storage system 610 in response to various triggers, such as a buffer being full or more buffer space being needed for new file data requests.

While access systems 630 and file system clients 660 are shown in a one-to-one correlation with communication from, for example, file system client 660.1 to access system 630.1, alternate configurations may include different numbers and communication paths with regard to access systems and client systems. For example, a single access system may handle file data requests from a plurality of file system clients or a single file system client may send different file data requests to a plurality of access systems. In some configurations, a plurality of access systems 630 are configured with a plurality of file system clients 660 such that file data requests may be sent from and handled by any system for redundancy and/or requests may be dynamically load balanced across the available access systems and/or file system clients. Access systems 630 may be configured with metadata stores similar to metadata store 550 in FIG. 5 distributed and/or accessible through remote queries from storage daemons 632 of other access systems to assure cache coherence checking across access systems and regardless of source file system client.

Figure 7:
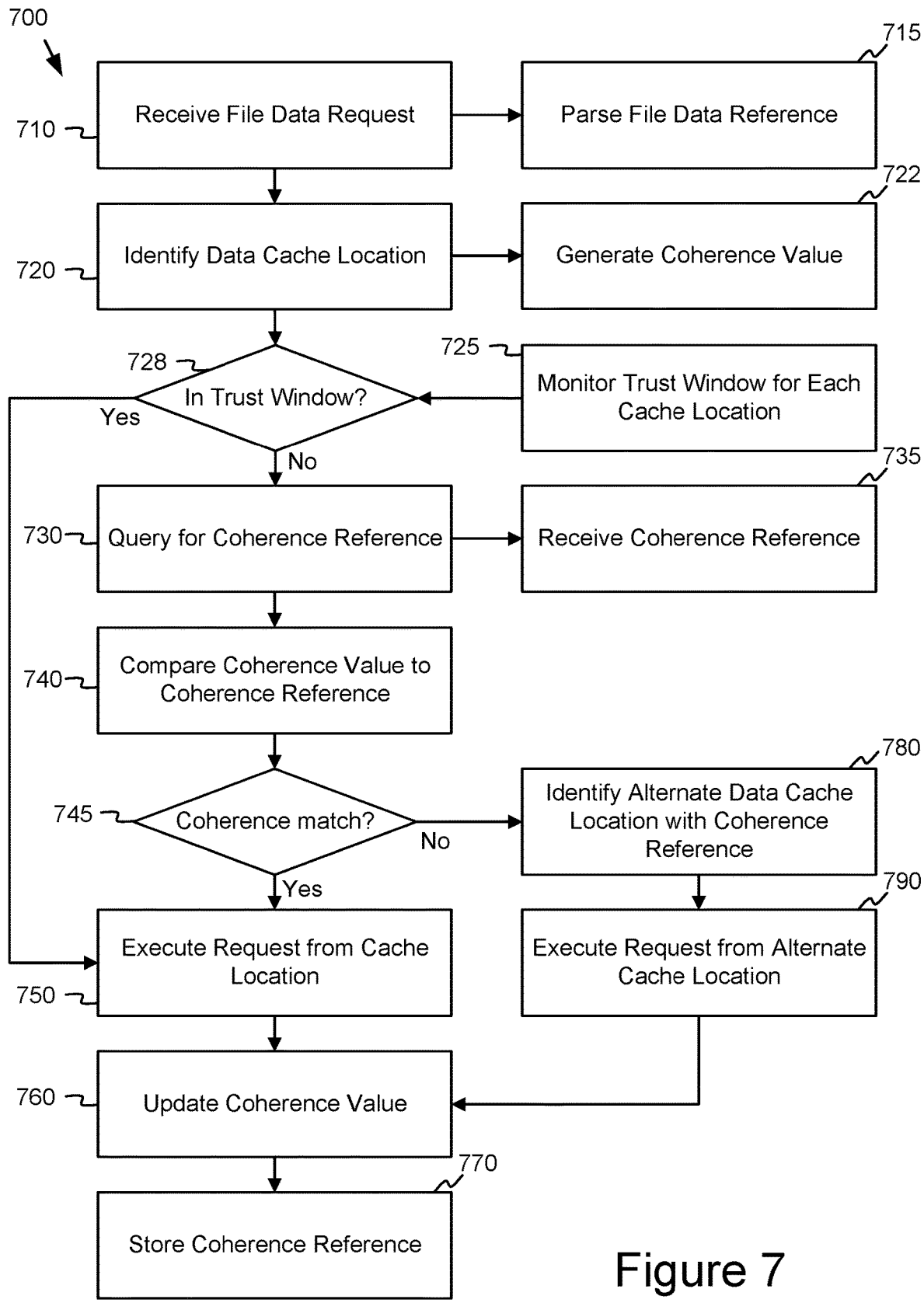
FIG. 7 illustrates an example of a method for maintaining cache coherence within a file system interface.

As shown in FIG. 7, the access systems 630 may be operated according to a cache coherence management method for preventing processing of file data requests from non-coherent cache memory, i.e. according to the method 700 illustrated by the blocks 710-790 of FIG. 7.

When a client application is configured to manipulate file data stored on a distributed storage system, a file data request may be received at block 710 by an access system with a file system interface including a file server. For example, a new file data request may be received that references one or more file data elements previously written to cache in the access system.

At block 715, a file data reference may be parsed from the file data request. For example, the file data request may be parsed according to the file system protocol to identify a one or more file data references for the file data stored in cache. In some embodiments, a file request time may be captured and used for generating coherence values at block 725.

At block 720, a data cache location corresponding to the file data references may be identified. For example, the local data cache may include the target file data and identify a target cache storage location (e.g. buffer identifier and storage location within the identified buffer) corresponding to the target file data.

At block 722, the access system may generate a coherence value corresponding to the target cache storage location. For example, the access system may store a coherence value corresponding to the buffer each time file data has written to the target buffer.

In some embodiments, at block 725, the access system may monitor a trust window for each data cache location. For example, a configurable trust window time threshold, such as 25 milliseconds, 1 second, or another suitable value, may be compared to an elapsed time since the last transaction to the data cache location identified at block 720. At block 728, the access system may determine whether the present transaction time is in the trust window for the target cache location if the transaction time is less than the trust window time threshold. If the transaction is within the trust window, method 700 may proceed to block 750 without checking for cache coherence. If the transaction is outside the trust window, method 700 may proceed to block 730.

At block 730, a coherence reference data store may be queried for a coherence reference for the current version of a file data element. For example, the access system may send a query to a shared metadata store that maintains coherence references for each file data reference stored in cache among the access systems. At block 735, the coherence reference may be received in response to the query.

At block 740, the coherence value for the target buffer may be compared to the coherence reference received from the coherence reference data store. For example, each location value of the coherence value associated with the target file data may be compared to each location value of the coherence reference.

At block 745, the access system evaluates whether the coherence value matches the coherence reference. If there is a coherence match, method 700 may continue to block 750. If there is not a coherence match, method 700 may proceed to block 780.

At block 750, the new file data request may be executed using the target buffer in the cache. For example, a read or write request may be executed using the file data in the coherent cache.

At block 760, the coherence value may be updated for the buffer based on any write request or other changes to the target file data. For example, a time-based hash for the updated storage location within the buffer may replace the prior time-based hash for that storage location in the updated coherence value. The updated coherence value may be stored locally for use when resolving the next attempt to process a data request using the file data in cache.

At block 770, the access system may store the updated coherence value as a new coherence reference in the coherence reference data store. For example, the updated coherence value may be used to replace the prior coherence reference associated with the file data references in the metadata store used by the access systems.

At block 780, in response to determining that the target data cache location is not coherent, an alternate data cache location may be identified from the coherence reference. For example, the coherence reference and/or associated metadata entry may include a cache data reference for a second cache data location containing the current file data, such as a buffer identifier for a buffer in the cache of another access system.

At block 790, the file data request may be executed or processed with regard to the alternate cache location. For example, a remote cache request may be used to process the file data request on the coherent file data stored in another access system.

Figure 8:
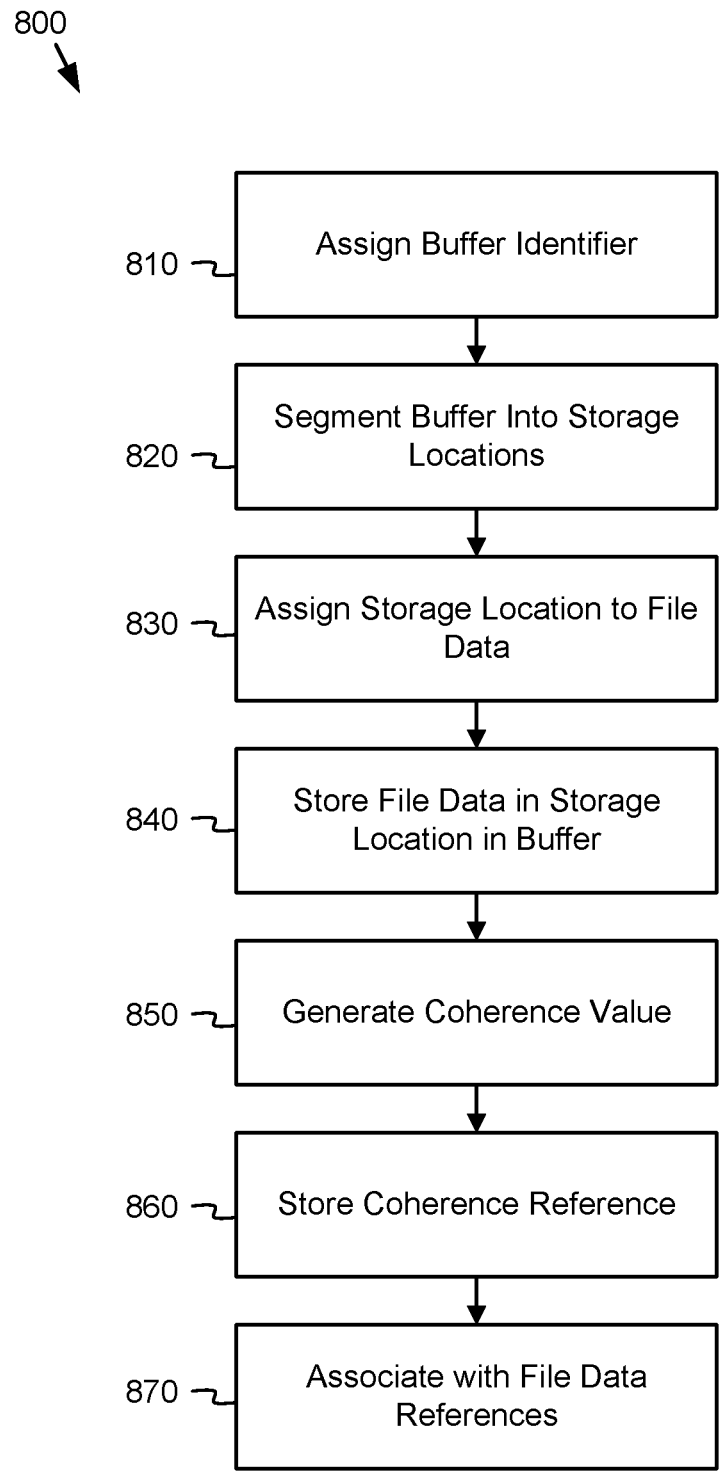
FIG. 8 illustrates an example method of generating cache references, such as may be used with the method of FIG. 7.

As shown in FIG. 8, in some embodiments, the access systems 630 may be further operated according to a coherence value and reference generation method to support cache coherence checking, i.e. according to the method 800 illustrated by the blocks 810-870 of FIG. 8.

An access system may be configured to generate coherence values for each buffer in cache and then store those cache values both locally and in a reference data store for use as a coherence reference. At block 810, a unique buffer identifier is assigned to each buffer or similar cache memory segment being used for read/write cache. For example, the 2.72 GB data cache of an access system may be divided into 340 buffers, each 8 MB long and each assigned a unique buffer identifier. In some embodiments, the unique buffer identifiers include a system ID and are unique among access systems in the distributed storage system.

At block 820, the buffer may be segmented into storage locations. For example, the buffer may be divided into equal bytes or blocks with a granularity appropriate to the file data sizes received from client file systems or may be segmented in variable length blocks corresponding to the file data sizes allocated in the buffer (and described by starting position and length or range) in blocks 830 and 840.

At block 830, a storage location may be assigned to the file data in a new file data request. For example, the access system may select the next segment of buffer in a buffer that still has unused space to receive the file data for a file data request, where the file data size is less than the remaining unused buffer.

At block 840, the file data is written to the assigned storage location. For example, the file data may be written with a starting position and length or range within the buffer.

At block 850, a new segment value is generated for the newly written segment and associated with the coherence value of the buffer. For example, a time-based hash may be added for the new segment value, adding to the prior segment values in the coherence value and/or replacing a prior segment value for earlier written file data. The coherence value may be stored locally for the buffer to be used in subsequent cache coherence checks and as the basis for a new coherence value in response to further file data segments and/or segment updates in the buffer.

At block 860, the coherence value may be stored as a coherence reference in a shared reference data store. For example, the coherence value may be written to a metadata store accessible by a plurality of access systems.

At block 870, the coherence reference may be associated with each file data reference for file data in the buffer. For example, the coherence reference may be written to each key value entry corresponding to the file data references in the metadata store.

Figure 9:
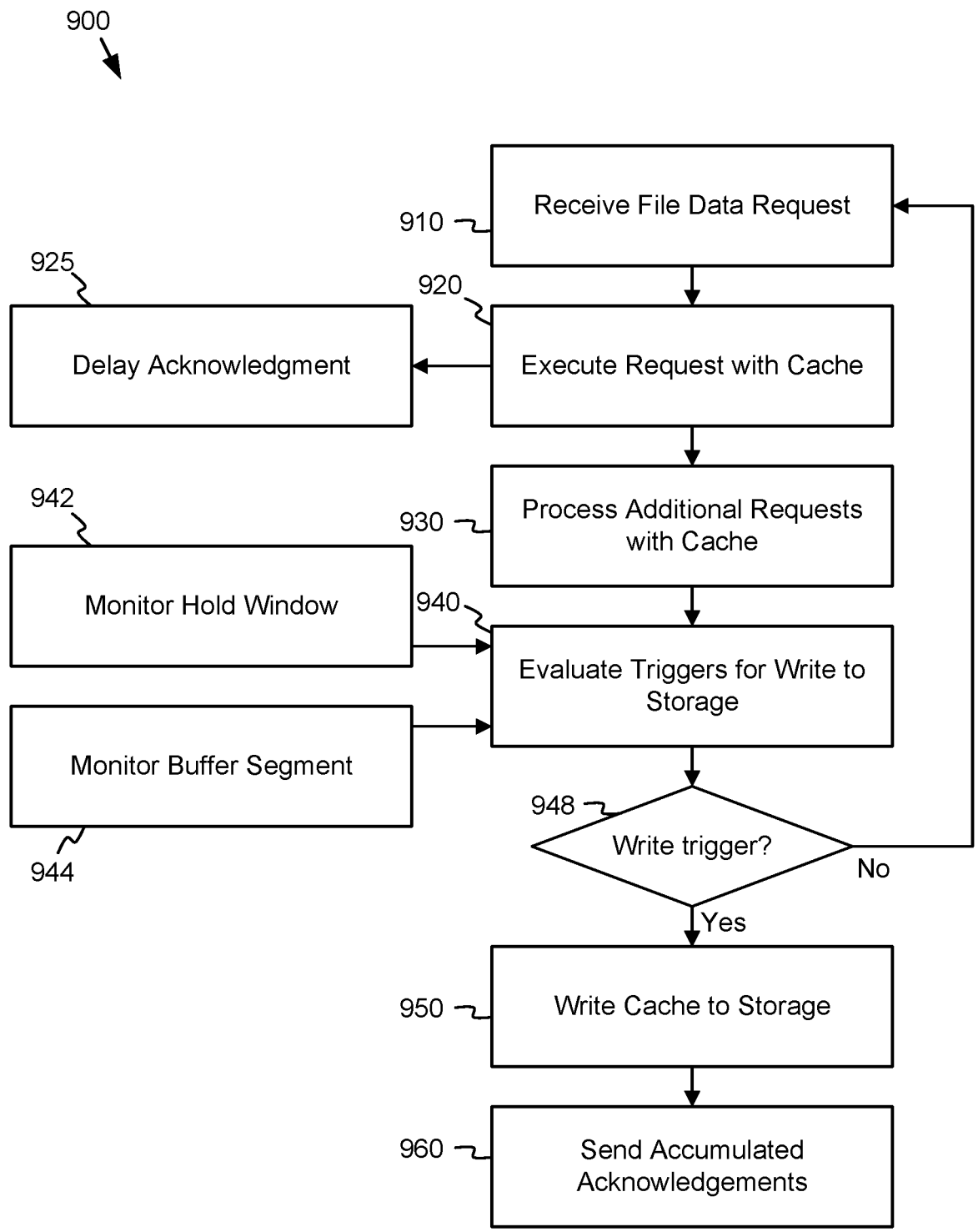
FIG. 9 illustrates an example method of handling file requests executed from cache, such as may be used with the method of FIG. 7.

As shown in FIG. 9, in some embodiments, the access systems 630 may be further operated according to a delayed acknowledgement method to prevent prematurely acknowledging persistent storage during cached operations, i.e. according to the method 900 illustrated by the blocks 910-960 of FIG. 9.

In response to an access system receiving a new file data request, file system protocols may include generation of an acknowledgement message when a write operation has been completed. At block 910, a file data request may be received that would generate an acknowledgement when processed. For example, a write request to the access system may be provided with the understanding that when the operation is complete the file data has been written to persistent storage and the client system does not need to maintain a copy against loss.

At block 920, the file data request is executed with cache memory. For example, the new file data in the write request may be written to a cache data location (e.g. buffer) and metadata may be updated to reflect the location of the cached file data, as well as its coherence reference.

At block 925, the acknowledgement that may normally be associated with processing the file data request is delayed. For example, rather than sending the acknowledgement, the file data request may be logged with a delayed acknowledgement status (in a transaction log or status entry in metadata for the file data) and/or the access system may maintain a list of delayed acknowledgements.

At block 930, additional file data requests may be processed from or to the cache. For example, additional write requests may be processed to adjacent storage locations and aggregated in a buffer space before being committed to persistent storage in the backend system.

At block 940, one or more triggers for committing cached file data to persistent storage may be evaluated. For example, a buffer may automatically trigger transfer to persistent storage when full, buffers may be committed and emptied when the cache memory becomes full or a buffer location is needed for read or write efficiency, or other trigger conditions. At block 942, a hold window may be monitored to delay acknowledgement and wait for addition requests to fill a buffer segment. If the hold time of the hold window for the buffer segment elapses, that may be a write trigger for the buffer segment. At block 944, each buffer segment may be monitored to determine when the buffer segment is full. If a write request fills a buffer segment, that may be a write trigger for the buffer segment. At block 948, if the write to persistent storage trigger has been met, method 900 may proceed to block 950. If the trigger has not been met, method 900 may return to block 910 to receive another file data request.

At block 950, the file data in cache may be written to persistent storage. For example, the contents of one or more buffers may be written as a storage element to the backend storage system, such as an aggregate data object written to an object storage system.

At block 960, the accumulated delayed acknowledgements may be sent to the client system(s). For example, the access system may identify each file data element and corresponding file data requests and/or unsent acknowledgements from file request status information and generate one or more acknowledgement messages to the client systems that sent the file data requests.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
 a first file server configured to manage a plurality of file data requests from at least one client system, wherein the first file server and the at least one client system use a file system protocol for the plurality of file data requests;
 a first data cache;
 a reference data store configured to store a cross-reference of file data references and storage data references; and
 a cache coherence manager configured to:
  assign at least one coherence value to the first data cache, wherein the at least one coherence value corresponds to at least one file data reference for file data in the first data cache;
  store the at least one coherence value in a coherence reference associated with the at least one file data reference for file data in the first data cache; and
  in response to a new file data request corresponding to the at least one file data reference, compare the at least one coherence value of the first data cache to the coherence reference associated with the at least one file data reference,
 wherein the first file server is further configured to execute, responsive to a comparison between the at least one coherence value of the first data cache and the coherence reference, the new file data request using one of: file data in the first data cache if the comparison matches; and file data in a second data cache location in a second data cache if the comparison does not match, wherein the first file server identifies the second data cache location based on the coherence reference.

2. The system of claim 1, further comprising:
 a first cache manager in communication with the first file server and the first data cache, wherein:
  the first data cache includes a plurality of buffer segments, wherein each buffer segment from the plurality of buffer segments has:
   a buffer size corresponding to a preferred data element size; and
   a plurality of storage locations for data bytes; and
  the first cache manager is configured to:
   aggregate file data requests received by the first file server;
   assign a unique buffer identifier to each of the plurality of buffer segments; and
   assign, responsive to the file data requests, a plurality of byte ranges for file data stored in the plurality of storage locations in the first data cache.

3. The system of claim 1, wherein the at least one coherence value includes a time-based hash value corresponding to a plurality of storage locations in the first data cache.

4. The system of claim 1, wherein:
 file data requests include file data bytes having a file data byte range;
 the first data cache includes a plurality of storage locations for storing at least one file data byte range; and
 the at least one coherence value includes a plurality of hash values of file data byte ranges in the plurality of storage locations in the first data cache.

5. The system of claim 4, wherein the cache coherence manager is further configured to:
 responsive to file data requests including at least one file data overwrite command for an affected file data byte range, update at least one coherence value including the affected file data byte range using a time-based hash value for the affected file data byte range; and
 store at least one updated coherence value in the coherence reference for the affected file data byte range.

6. The system of claim 1, further comprising:
 a client response handler configured to:
  aggregate a plurality of acknowledgement messages corresponding to cached writes to a buffer segment in the first data cache, wherein the cached writes are not stored to persistent storage; and
  send the aggregated plurality of acknowledgement messages responsive to:
   a hold time for the buffer segment expiring; and
   a storage interface, responsive to the hold time expiring, writing contents of the buffer segment to persistent storage.

7. The system of claim 1, wherein the reference data store includes a key-value store associating file data references, storage data references, and a plurality of coherence references for the first data cache.

8. The system of claim 1, further comprising:
 a second file server configured to manage a plurality of file data requests from at least one client system using the file system protocol;
 the second data cache;
 a first cache manager in communication with the first file server and the first data cache, wherein the first cache manager is configured to aggregate file data requests received by the first file server in the first data cache; and
 a second cache manager in communication with the second file server and the second data cache, wherein the second cache manager is configured to aggregate file data requests received by the second file server in the second data cache,
 wherein:
  the cache coherence manager is further configured to:
   assign at least one coherence value to the second data cache, wherein the at least one coherence value corresponds to at least one file data reference for file data in the second data cache; and
   store the at least one coherence value for the second data cache in the coherence reference associated with the at least one file data reference for file data in the first data cache.

9. A computer-implemented method, comprising:
 receiving a file data request including a file data reference;
 identifying a first data cache location corresponding to the file data reference, wherein the first data cache location has a first coherence value;
 querying a reference data store for a coherence reference corresponding to the file data reference;
 comparing the first coherence value to the coherence reference;
 responsive to the first coherence value matching the coherence reference, executing the file data request using the first data cache location; and
 responsive to the first coherence value not matching the coherence reference:
  identifying, based on the coherence reference, a second data cache location; and
  executing the file data request using the second data cache location.

10. The computer-implemented method of claim 9, further comprising:
generating the first coherence value using a hash value of a plurality of storage locations in the first data cache location at a request time of the file data request.

11. The computer-implemented method of claim 10, further comprising:
monitoring a trust window time threshold for the first data cache location; and
selectively executing, responsive to a transaction time of the file data request being less than the trust window time threshold, the file data request using the first data cache location without:
querying the reference data store; and
comparing the first coherence value.

12. The computer-implemented method of claim 10, further comprising, following executing the file data request using the first data cache location:
updating the first coherence value using an updated hash value of the plurality of storage locations in the first data cache location after executing the file data request; and
storing the updated first coherence value as an updated coherence reference in the reference data store.

13. The computer-implemented method of claim 9, further comprising:
aggregating file data from a plurality of file data requests in a first data cache including the first data cache location;
delaying sending at least one acknowledgement message for the plurality of file data requests;
writing an aggregate data element corresponding to the first data cache to a storage system; and
sending, responsive to writing the aggregate data element, the at least one acknowledgment message.

14. The computer-implemented method of claim 9, further comprising:
assigning a unique buffer identifier to each of a plurality of buffer segments in a first data cache including the first data cache location, wherein the plurality of buffer segments each have:
a buffer size corresponding to a preferred data element size; and
a plurality of storage locations for data bytes received in file data requests;
assigning a plurality of byte ranges for file data stored in the plurality of storage locations in the first data cache; and
storing at least one cache data reference in the reference data store using the unique buffer identifier and the plurality of byte ranges, wherein the at least one cache data reference is associated with a cross-reference to a plurality of file data references for the file data in the first data cache.

15. A system, comprising:
a plurality of file servers configured to manage a plurality of file data requests from at least one client system wherein:
the plurality of file servers and the at least one client system use a file system protocol for the plurality of file data requests; and
each of the plurality of file servers includes at least one data cache;
means for assigning coherence values to each of the at least one data cache in the plurality of file servers;
means for storing the coherence values in corresponding coherence references associated with file data references for file data in each of the at least one data cache in the plurality of file servers;
means for, responsive to receiving a new file data request at a receiving file server, comparing a request coherence value for the at least one data cache in the receiving file server to a request coherence reference, wherein the request coherence value and the request coherence reference correspond to a request file data reference in the new file data request;
means for executing the new file data request using the at least one data cache in the receiving file server in response to the request coherence value matching the request coherence references;
means for identifying, responsive to the request coherence value being different than the request coherence reference, an updated data cache location based on the request coherence reference; and
means for executing the new file data request using the updated data cache location.

16. The system of claim 15, further comprising:
means for updating, following executing the new file data request using the at least one data cache in the receiving file server, the request coherence reference using an updated hash value of a plurality of storage locations in the at least one data cache in the receiving file server after executing the new file data request.

17. The system of claim 15, further comprising:
means for assigning a unique buffer identifier to each of a plurality of buffer segments in the at least one data cache; and
means for assigning a plurality of byte ranges for file data stored in a plurality of storage locations in the plurality of buffer segments.

18. The system of claim 15, further comprising:
means for writing an aggregate data element from the at least one data cache to a storage system; and
means for storing a cross-reference of file data references and storage data references, wherein the means of storing the cross-reference includes, for file data in the at least one data cache in the plurality of file servers, a key-value store associating:
file data references;
storage data references; and
coherence references.

* * * * *